(12) United States Patent
Laansoo et al.

(10) Patent No.: US 8,108,781 B2
(45) Date of Patent: Jan. 31, 2012

(54) SEARCHING METHOD AND APPARATUS (75) Inventors: Erik Laansoo, Tallinn (EE); Priidu Zilmer, Tallinn (EE)

(73) Assignee: Skype Limited, Dublin (IE)

( * ) Notice: Subject to any disclaimer, the term of this patent is extended or adjusted under 35 U.S.C. 154(b) by 716 days.

(21) Appl. No.: 12/220,440

(22) Filed: Jul. 24, 2008

(65) Prior Publication Data
US 2009/0319941 A1 Dec. 24, 2009

(30) Foreign Application Priority Data

Jun. 18, 2008 (GB) .................................. 0811196.5

(51) Int. Cl.
*G06F 15/00* (2006.01)
*G06F 13/00* (2006.01)

(52) U.S. Cl. ........................ 715/751; 715/748

(58) Field of Classification Search .......... 715/715–717, 715/851–853, 763–765, 780, 748–751, 839–841
See application file for complete search history.

(56) References Cited

U.S. PATENT DOCUMENTS

| 2004/0199590 | A1* | 10/2004 | Keohane et al. | 709/206 |
| 2005/0114781 | A1 | 5/2005 | Brownholtz et al. | |
| 2005/0149858 | A1* | 7/2005 | Stern et al. | 715/513 |

FOREIGN PATENT DOCUMENTS

| EP | 1 762 968 A1 | 3/2007 |
| EP | 1 785 892 A2 | 5/2007 |
| EP | 1785892 A2 * | 5/2007 |
| WO | WO 03/056789 A1 | 7/2003 |

OTHER PUBLICATIONS

Invitation to Pay Additional Fees and, Where Applicable, Protest Fee and Communication Relating to the Results of the Partial International Search, International Application No. PCT/EP2009/057489, mailed on Dec. 11, 2009.

Notification of Transmittal of The International Search Report and The Written Opinion of the International Searching Authority, or the Declaration, for PCT/EP2009/057489, mailed Apr. 23, 2010.

\* cited by examiner

*Primary Examiner* — Cao "Kevin" Nguyen
(74) *Attorney, Agent, or Firm* — Hamilton, Brook, Smith & Reynolds, P.C.

(57) ABSTRACT

A method of searching for a data item in a stored chronological sequence of communication events relating to a user of a user terminal is provided. The method comprises: querying a communication event database comprising individually accessible records of each of the communication events, each record being associated with an event time at which the communication event occurred, wherein the step of querying locates a target event comprising the data item and having an event time earlier than a predetermined first time instance; loading the target event into a storage means; displaying the contents of the target event to the user in a user interface; and loading communication events occurring in a time period between the event time and the first time instance of the target event into the storage means and updating the display to include the contents of the communication events occurring in the time period.

31 Claims, 5 Drawing Sheets

SEARCHING METHOD AND APPARATUS

RELATED APPLICATION

This application claims priority under 35 U.S.C. §119 or 365 to Great Britain, Application No. 0811196.5, filed Jun. 18, 2008. The entire teachings of the above application are incorporated herein by reference.

TECHNICAL FIELD

This invention relates to a searching method and apparatus.

BACKGROUND

Packet-based communication systems allow the user of a device, such as a personal computer, to communicate using computer network such as the Internet. Packet-based communication systems can offer voice over internet protocol ("VoIP") communication, video calling, instant messaging, voicemail and file transfer. These systems are beneficial to the user as they are often of significantly lower cost than fixed line or mobile networks. This may particularly be the case for long-distance communication. To make use of such systems, the user must install and execute client software on their device. The client software provides the communication connections as well as other functions such as registration and authentication.

A feature of packet-based communication systems is that the client software can maintain a history of the communication events that are occurring between users. This enables a record of conversations and events to be maintained, which is useful for enabling users to resume conversations or refer back to previous events. The history of communication events comprises the text of instant message chats or SMS messages, records of the time and duration of voice or video calls or voicemails, and file transfers sent between users. As the number of communication events instigated or received by the client software increases, a continuous record of events is created. The history is viewable by the user as a long formatted text document in a form similar to a document such as a webpage, in which the user is able to freely scroll the document and select arbitrary amounts of text and other content.

However, the amount of data accumulated in the history of communication events performed over the communication system can be very considerable. The history can easily reach tens of thousands of messages, resulting in documents that are hundreds of pages long. Handling documents of this length (which contain complex formatting) is very difficult, due to the requirements placed on the consumption of system resources. In addition, the navigation of documents of such length is difficult and cumbersome for the user.

SUMMARY

There is therefore a need for a technique that allows the user to find information contained in the communication event history rapidly, without requiring the use of large amounts of processing or system resources and in a manner intuitive to a non-technical user.

According to one aspect of the present invention there is provided a method of searching for a data item in a stored chronological sequence of communication events relating to a user of a user terminal, comprising: querying a communication event database comprising individually accessible records of each of the communication events, each record being associated with an event time at which the communication event occurred, wherein the step of querying locates a target event comprising the data item and having an event time earlier than a predetermined first time instance; loading the target event into a storage means; displaying the contents of the target event to the user in a user interface; and loading communication events occurring in a time period between the event time and the first time instance of the target event into the storage means and updating the display to include the contents of the communication events occurring in the time period.

Because only communication events that are from the event time of the target event or later are loaded into the storage means and displayed to the user, the amount of system resources required are minimised. This is because communication events are only displayed as far back in time as needed to show the target event. This reduces the demands on memory and processing at the user terminal. In addition, because only as many communication events as required are loaded and displayed, the information displayed is easier for the user to navigate and is less confusing. A complete chronological sequence of communication events back to the target event are displayed to the user, with no gaps in the communication event sequence. This allows the user to easily view the sequence of communication events back to the target event, which is much easier for the user to interpret than a search which merely returns a single discrete communication event containing the data item.

Preferably, the steps of displaying the contents of the target event and loading communication events are performed concurrently.

Because the target event is displayed concurrently with loading the intermediate portion, the display of the search results (i.e. the target event containing the data item) is very fast. The user is presented with the result immediately upon display of the target event, and the other communication events are loaded in the background whilst the user is viewing the result. This allows the search method to return very fast results to the user, regardless of how large the data file is, and whether there is a large chronological gap between the first time instance and the time of occurrence of the target event (i.e. a large number of communication events in the time period between the event time and the first time instance). The returning of fast results enables the search to be performed as the user types the data item to be searched from a document that can be arbitrarily long.

Preferably, the step of loading communication events and updating the display is performed in a sequence starting with the communication events occurring at the event time and ending with the first time instance.

By loading the communication events in this sequence, the communication events that are displayed closest to the target event are loaded and displayed first. This ensures that the part of the display that the user is currently focussed on is updated before the parts that are not currently visible to the user.

Preferably, the method further comprises the step of receiving the data item from the user of the user terminal. Preferably, the data item comprises at least one character. Preferably, the method further comprises the step of receiving a value for the first time instance from the user of the user terminal. Preferably, the value for the first time instance is selected by the user from a range displayed in the user interface. Preferably, the step of displaying the contents of the target event comprises scrolling the display to show the contents of the target event in the user interface and highlighting the data item in the target event.

Preferably, the method further comprises the step of, subsequent to loading the target event into the storage means, searching the target event in the storage means to apply additional search constraints of the data item. Preferably, if the additional search constraints are not found in the target event, performing a further query on the communication event database to locate a further target event comprising the data item and having an event time earlier than the target event.

By performing a further search to apply additional search constraints of the data item when loaded into the storage means additional checks can be made to ensure that the content of the target event matches the data item requirements, for example for case-sensitivity or the matching of a whole word. In addition, this confirmation ensures the accuracy and integrity of the communication event database.

Preferably, the method further comprises the steps of: prior to querying the communication event database, loading a first portion of the stored chronological sequence of communication events into the storage means, the first portion representing communication events occurring since the first time instance; displaying the contents of the first portion to the user in a user interface; and searching for the data item in the first portion in the storage means, wherein the step of querying the communication event database is performed in the case that the data item is not located in the first portion.

Preferably, the communication events comprise at least one of: instant messages, short message service messages, file transfers, voice call records, video call records, and voicemail records. Preferably, the storage means is a computer memory of the user terminal. Preferably, the communication event database is stored on a hard disk drive of the user terminal. Preferably, the user terminal is connected to a packet-based communication network. Preferably, the user terminal is connected to a peer-to-peer communication network.

According to another aspect of the invention, there is provided a computer program product comprising program code means which, when executed by a computer implement the steps according to the above-described method.

According to another aspect of the invention, there is provided a user terminal arranged to search for a data item in a stored chronological sequence of communication events relating to a user of the user terminal, comprising: a communication event database comprising individually accessible records of each of the communication events, each record being associated with an event time at which the communication event occurred; a storage means; a user interface means arranged to display information to the user of the user terminal; processing means arranged to execute a communication client, wherein the communication client is arranged to query the communication event database to locate a target event comprising the data item and having an event time earlier than a predetermined first time instance, load the target event into the storage means; display the contents of the target event to the user in the user interface, and load communication events occurring in a time period between the event time and the first time instance of the target event into the storage means and update the display to include the contents of the communication events occurring in the time period.

According to another aspect of the invention, there is provided a user terminal, comprising: a display means; a storage device arranged to store a chronological sequence of communication events relating to a user of the user terminal; and a processing means arranged to execute a communication client, wherein the communication client is arranged to display a user interface on the display means, the user interface comprising a scale denoting a timeline relating to the chronological sequence of communication events and a movable control arranged to be moved along the scale by the user of the user terminal, wherein the communication client is arranged to load a set of communication events occurring up to a time instance determined by the position of the movable control on the scale from the storage device and display the set of communication events on the display means.

The user interface enables the user to manage a potentially very long sequence of communication events, which would otherwise be unwieldy for the user to navigate. The placement of the control on the scale provides the user with an instant visual indication of the time period over which he is viewing the sequence of communication events without having to scroll up though a long document to get to a particular time.

Preferably, the scale further comprises a plurality of labels denoting time instances along the timeline, wherein the plurality of labels are arranged to be selectable such that selecting one of the plurality of labels causes the movable control to move to the position of the selected label.

Preferably, the movable control is arranged to be movable by the user selecting the control with a pointing device and dragging the control along the scale.

Preferably, the user interface further comprises a search field, and wherein the communication client is arranged to search the chronological sequence of communication events responsive to the user entering a search term in the search field. Preferably, responsive to the search term being found in a target message in the chronological sequence of communication events, the target message is displayed on the display means, and the movable control is moved by the communication client to a position on the scale corresponding to the time of occurrence of the target message.

Because the communication client moves the movable control to a position on the scale corresponding to the time of the target message, the user is provided with an instant visual and graphical indication of the time of the target message containing the search term.

According to another aspect of the invention, there is provided a method of controlling a display of a stored chronological sequence of communication events relating to a user of a user terminal, comprising: displaying a user interface on a display means of the user terminal, the user interface comprising a scale denoting a timeline relating to the chronological sequence of communication events and a movable control; receiving a command from the user of the user terminal to move the movable control to a position on the scale; responsive to receiving the command, loading a set of communication events occurring up to a time instance determined by the position of the movable control from a storage device; and displaying the set of communication events on the display means.

According to another aspect of the invention, there is provided a computer program product comprising program code means which, when executed by a computer implement the steps according to the above-described method.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
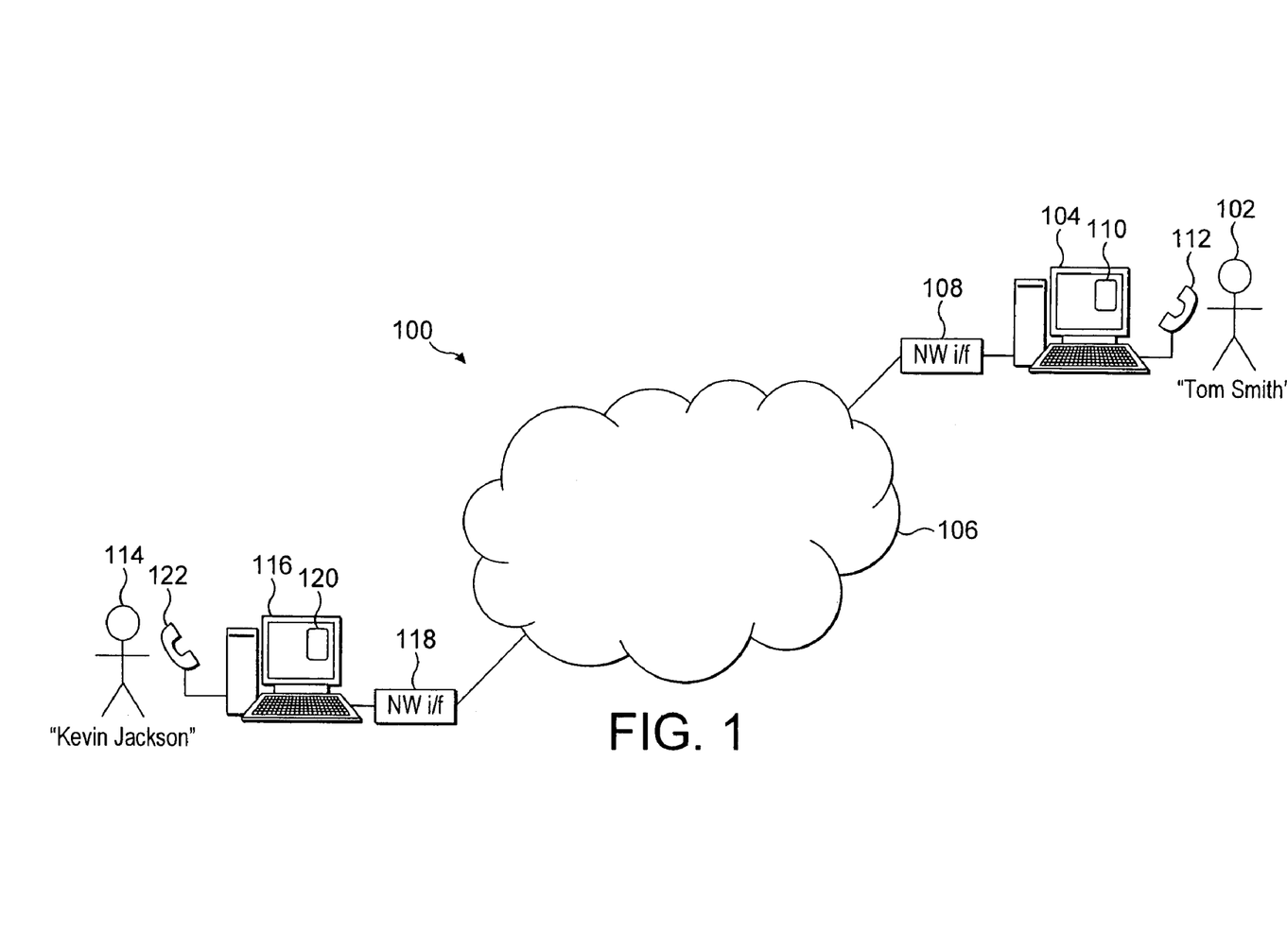
FIG. 1 shows a communication system.

Reference is first made to FIG. 1, which illustrates a communication system 100. Note that whilst this illustrative embodiment is described with reference to a peer-to-peer ("P2P") communication system, other types of communication system could also be used, such as non-P2P IM or VoIP systems. A first user of the communication system (named "Tom Smith" 102) operates a user terminal 104, which is shown connected to a network 106. Note that the network 106 utilises a communication system such as the Internet. The user terminal 104 may be, for example, a personal computer ("PC"), personal digital assistant ("PDA"), a mobile phone, a gaming device or other embedded device able to connect to the network 106. The user device is arranged to receive information from and output information to a user of the device. In a preferred embodiment of the invention the user device comprises a display such as a screen and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a communication client 110, provided by the software provider. The communication client 110 is a software program executed on a local processor in the user terminal 104. The user terminal 104 is also connected to a handset 112, which comprises a speaker and microphone to enable the user to listen and speak in a voice or video call. The microphone and speaker does not necessarily have to be in the form of a traditional telephone handset, but can be in the form of a headphone or earphone with an integrated microphone, or as a separate loudspeaker and microphone independently connected to the user terminal 104.

Figure 2:
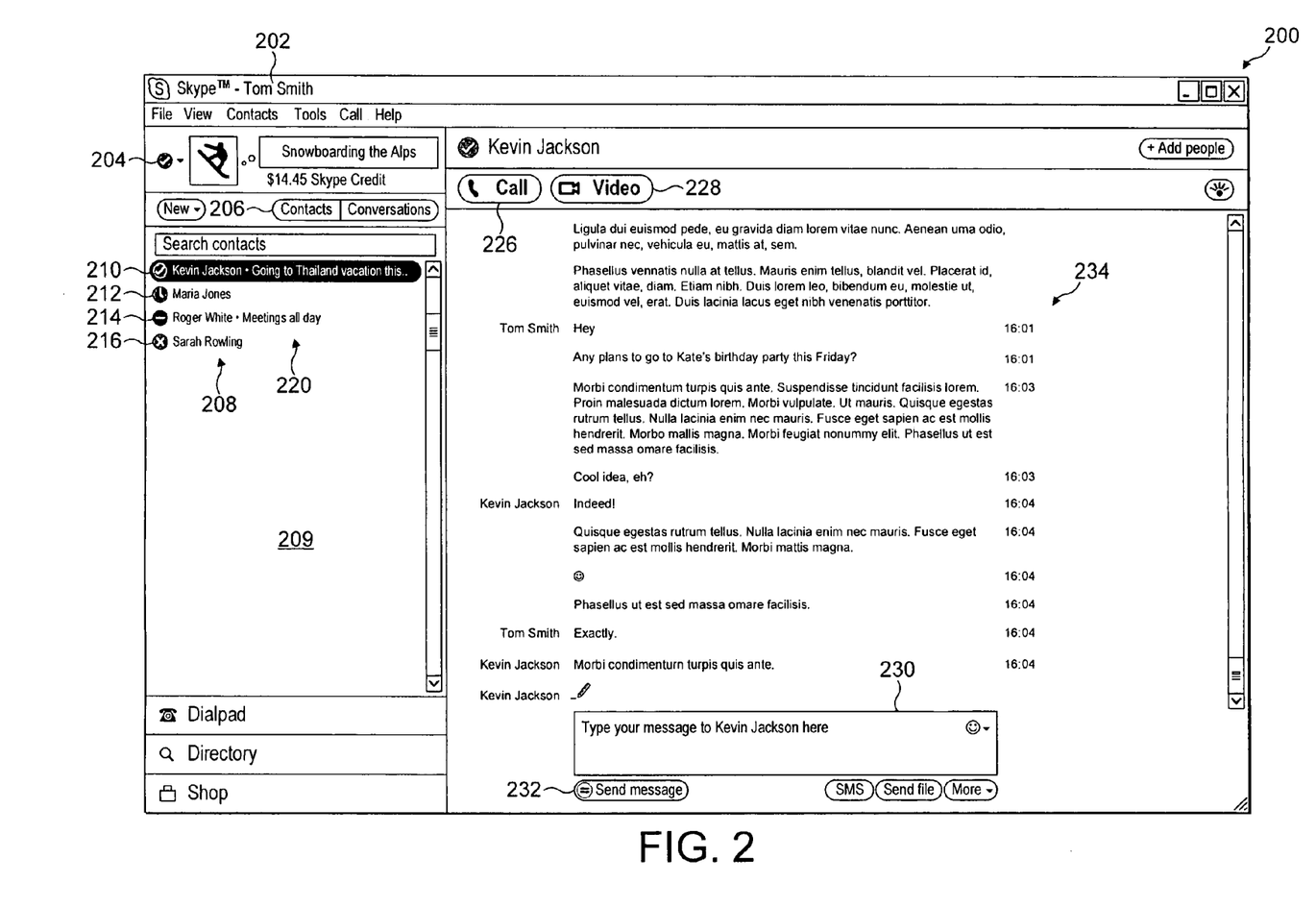
FIG. 2 shows a user interface of a communication client.

An example of a user interface 200 of the communication client 110 executed on the user terminal 104 of the first user 102 is shown illustrated in FIG. 2. The client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list 208 are displayed in a pane 209 below the button 206. In the example user interface in FIG. 2, four contacts of other users of the communication system are shown listed in contact list 208. Each of these contacts have authorised the user of the client 110 to view their contact details and user-defined presence state and mood message information. Each contact in the contact list has a presence status icon associated with it. For example, the presence status icon for "Kevin Jackson" 210 indicates that this contact is "online", the presence icon for "Maria Jones" 212 indicates that this contact is "away", the presence icon for "Roger White" 214 indicates that this contact's state is "do not disturb", the presence icon for "Sarah Rowling" 216 indicates that this contact is "offline". Further presence indications can also be included. Next to the names of the contacts in pane 209 are mood messages 220 of the contacts.

Calls to the users in the contact list may be initiated over the communication system by selecting the contact and clicking on a "call" button 226 or "video" button 228 using a pointing device such as a mouse. Similarly, IM messages can be sent by entering a message in the text field 230 and selecting the "send message" button 232. Referring again to FIG. 1, the connection set-up is performed using proprietary protocols, and the route over the network 106 between the calling user and called user is determined by the peer-to-peer system without the use of servers.

For example, the first user "Tom Smith" 102 can call a second user "Kevin Jackson" 114. The client 110 performs the encoding and decoding of VoIP packets. VoIP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

Connections between users of the communication system are also established for the purposes of other communications, such as IM messages and file transfers, in a similar manner.

As communication events occur between the user 102 and other users of the communication system, they are recorded in a message history (also called a conversation history). A separate message history is maintained for each of the other users of the communication system with whom communication events occur. FIG. 2 illustrates a portion of a message history 234 recording the communication events that have occurred between the user "Tom Smith" 102 and the user "Kevin Jackson" 114. The message history 234 comprises the text of each IM message sent by either user, along with a timestamp and an indication of who sent the message. The message history also comprises a record of calls made between the users, including a timestamp for the call, its duration and its type (e.g. voice or video). Further information recorded in the message history includes details of files sent between the users (such as a filename and timestamp), SMS messages sent, voicemails sent and received, and contact details sent and received.

Because the message history 234 comprises messages exchanged between the users, each of the individual messages within the history tends to require the presence of the surrounding messages to provide context and allow the message to be read and make sense. This is particularly the case for IM messages, where an individual message may only be a small part of an overall conversation. The message history 234 is therefore more than just a list of discrete events.

The message history 234 is displayed to the user in the UI 200 as a continuous, scrollable text-based document in a similar form to a hypertext mark-up language ("HTML") webpage. The document may also contain complex text-formatting, and images such as emoticons, icons, and image and video thumbnails. Each of the entries in the message history relate to a communication event, and they are listed in chronological order. In the UI 200 shown in FIG. 2, the most recent communication events are shown at the bottom of the UI, with the communication events becoming older as the user scrolls upwards.

Figure 3:
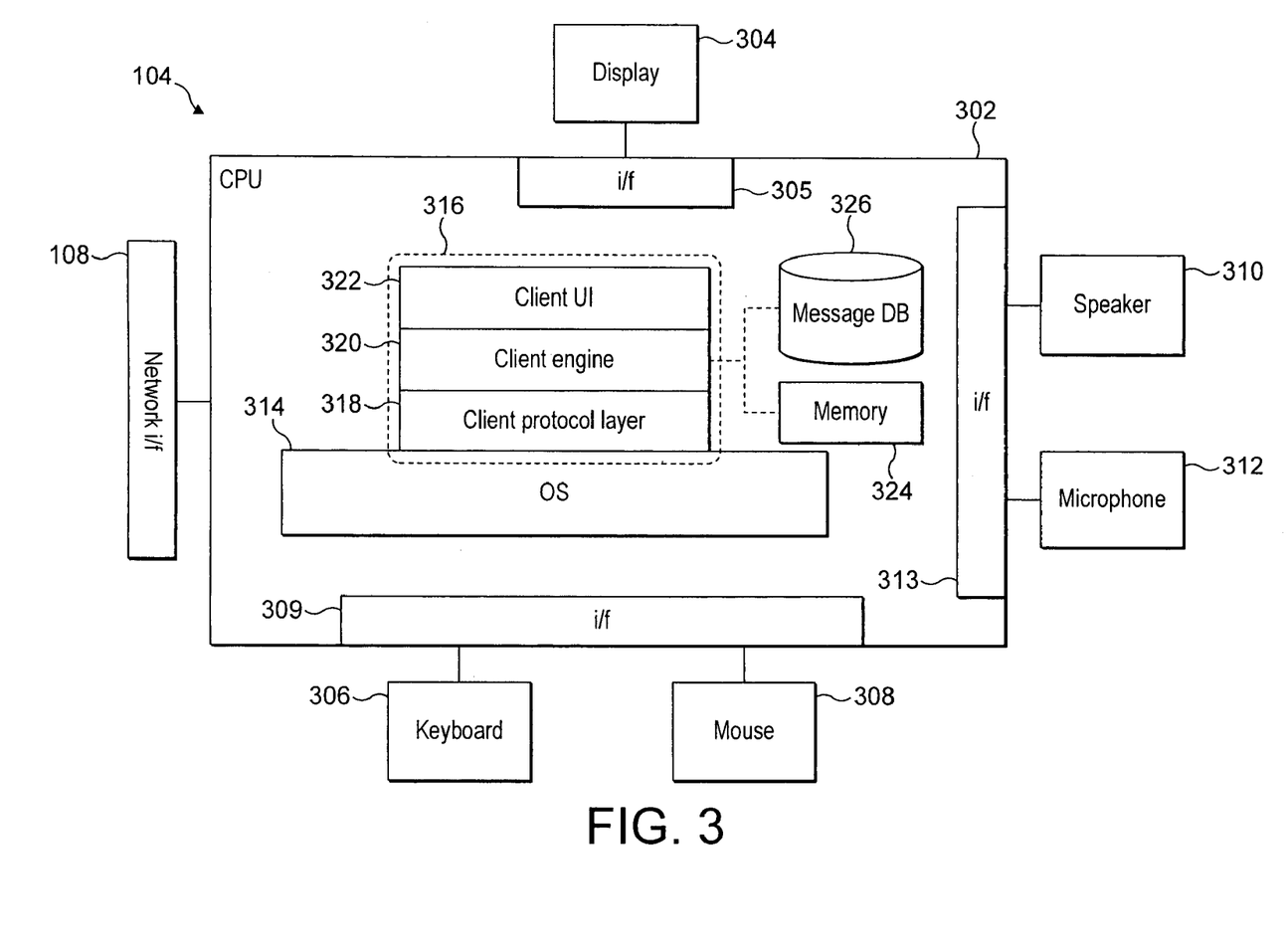
FIG. 3 shows a user terminal on which is executed a communication client.

FIG. 3 illustrates a detailed view of the user terminal 104 on which is executed client 110. The user terminal 104 comprises a central processing unit ("CPU") 302, to which is connected a display 304 such as a screen via a display interface 305, an input device such as a keyboard 306 and a pointing device such as a mouse 308 connected via an interface 309 such as USB. An output audio device 310 (e.g. a speaker) and an input audio device 312 (e.g. a microphone) are connected via an audio interface 313. The output audio device 310 and input audio device 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

The client engine layer 320 is also responsible for managing the message history. In particular, the client engine layer 320 controls the storing and retrieval of the messages from different locations in the user terminal. The portion of the history that is displayed in the UI 200 to the user is loaded into a memory 324 of the user terminal. The memory 324 provides fast access to the history data. In addition, the whole message history (i.e. not just the portion displayed in the UI) is stored in a message database 326. The message database is preferably stored on the hard disk drive of the user terminal, which can hold a large amount of data, but is not as fast to access as the memory 324. Furthermore the message database provides access to individual messages (i.e. all the messages are not simply concatenated into a single long file), and the database can be queried using known query languages, such as SQL. Whilst the message database 326 can be several orders of magnitude slower than the memory 324 for random access, it can nevertheless execute a specific query relatively quickly.

Figure 4:
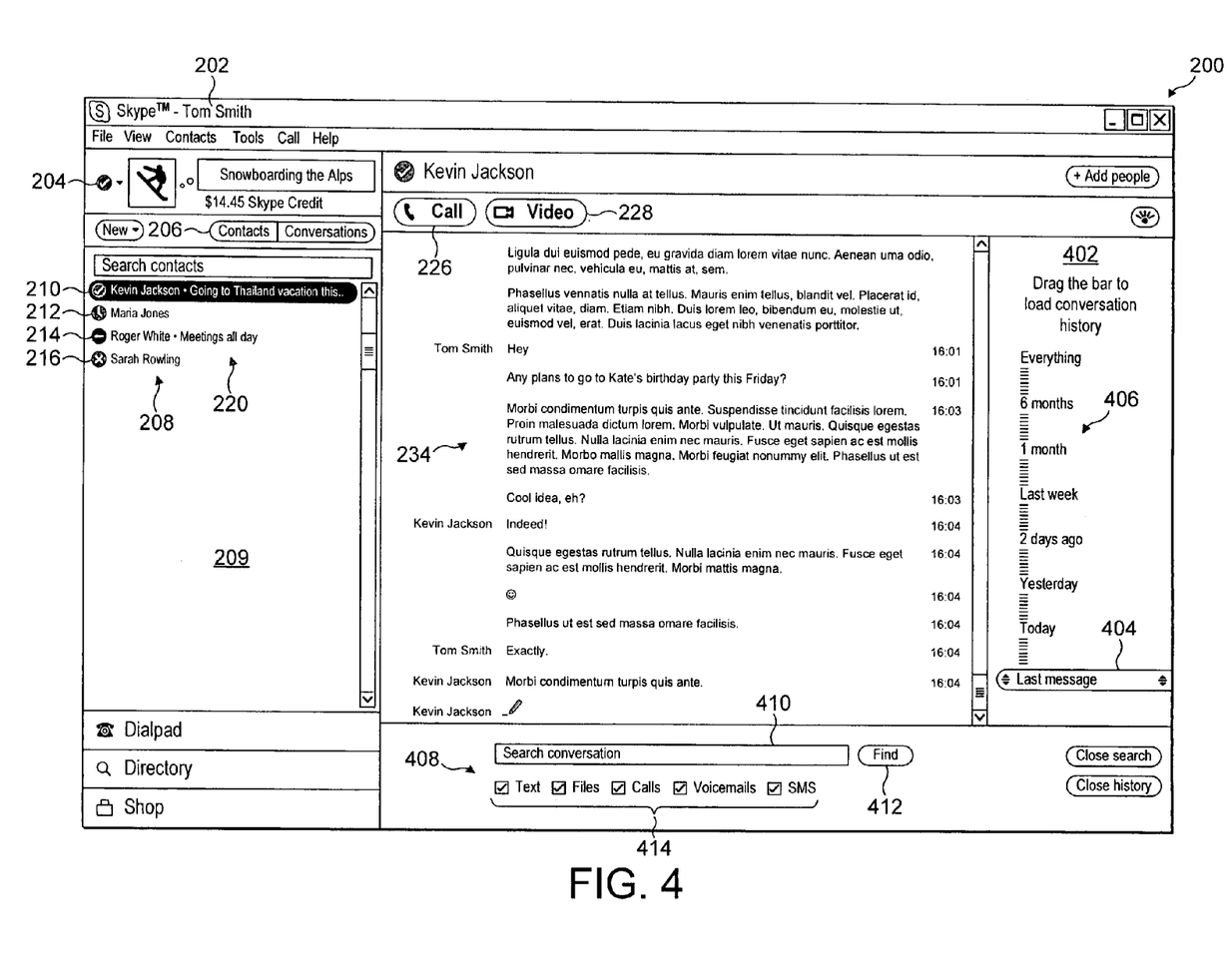
FIG. 4 shows a user interface showing a message history.

Reference is now made to FIG. 4, which illustrates a user interface for navigating and searching the message history. The user 102 is able to select how much of the message history is loaded into the memory 324 and displayed as a continuous document in the UI 200. The user 102 can do this by using the scale 402 to determine how far back in the chronological sequence of messages should be displayed in the history. The scale 402 comprises a slider 404 and a timeline 406. The user 102 can use the pointing device to drag the slider 404 to a point on the timeline 406. Alternatively, the user can click on one of the titles shown on the timeline 406 to move the slider 404 to that point. The location of the slider 404 on the timeline 406 is known as the history horizon. Note that the scale of the timeline 406 can be non-linear. This allows the scale to display a wider timescale but allow precise placement of the slider at dates closer to the present time.

When a given history horizon is selected, all of the messages that are in the message database 326 that have a timestamp later than or equal to the history horizon (i.e. between the present time and the history horizon) are loaded into the memory 324 and displayed in the UI 200. If a portion of the message history is already present in the memory 324 and displayed in the UI 200 when the history horizon is changed to a new value, then only the messages between the previous history horizon and the new history need to be loaded into the memory 324.

The loading of the messages into the memory 324 and displaying them in the UI is processed by the user terminal as a background operation that does not disrupt other user activities such as scrolling or selecting text.

The use of a user interface feature such as the scale 402 allows the user to easily control how much of the message history is displayed in the UI 200. This is advantageous as it allows the user to simply manage a potentially very long message history, which would be unwieldy for the user to navigate (as well as being resource hungry on the memory 324). The scale 402 gives the user a rapid visual indication of the time period over which he is viewing the history without having to scroll up though a very long document to get to a particular date. The colouring of the history scale can also be used to indicate the amount of messages loaded into the UI 200.

However, because the message history is potentially very long, it is also advantageous for the user to be able to perform a search within the information contained in the message history. Therefore, in addition to setting the history horizon using the scale 402, the user 102 can also search within the message history using a search interface 408. The user can enter a search term into a search field 410. Preferably, the search is begun as soon as characters are entered into the search field 410, such that results are presented from the very first character entered. The user can also repeat a search for a term already in the search field by pressing "enter" on the keyboard or selecting the "find" button 412. The user can also limit the search to particular types of communication event in the history by using the check-boxes 414. Preferably, the user can limit the search to any combination of text (such as IM messages), transferred files, calls (video or voice), voicemails, and SMS messages shown in the history.

Figure 5:
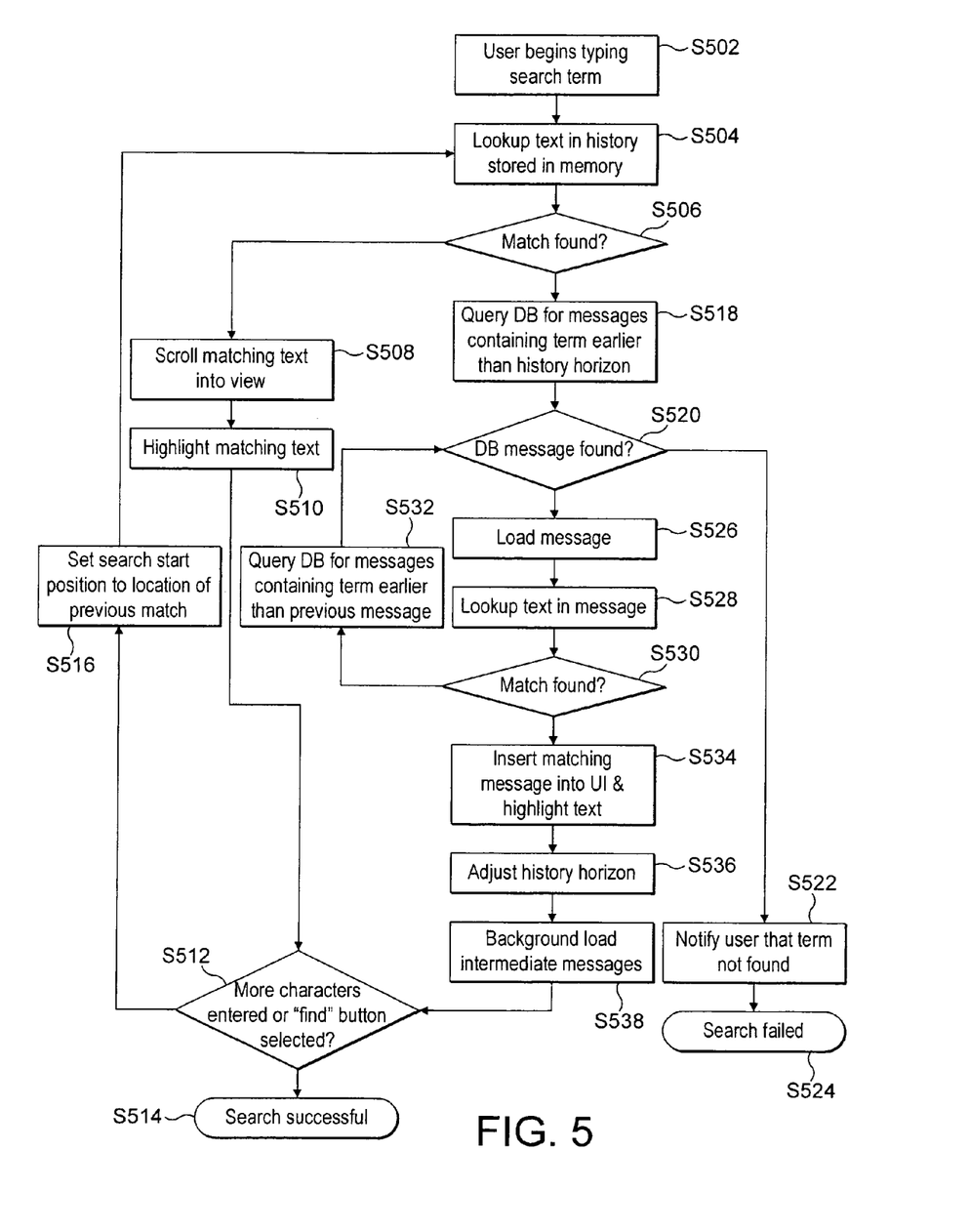
FIG. 5 shows a flowchart of a method of searching a message history.

A flowchart describing the method by which the message history is searched is shown in FIG. 5. In step S502 the user begins typing a search term into the search field 410. As soon as a character is entered into the search field 410, the search process is started. In step S504 the portion of the message history that is currently loaded into the memory 324 is searched for the presence of the search term. This corresponds to a search within the message history from the present time to the current history horizon. This process is quick due to the fast access times of memory 324. Preferably, the search is performed from newer towards older messages (i.e. towards the history horizon, or upwards as represented in the history 234 show in the UI 200).

If a match is found in S506, then in step S508 the matching text is scrolled into view in the UI 200, such that it is visible to the user 102. In addition, in step S510, the matching text is highlighted to make it stand out to the user 102.

As stated above, the search is performed instantly as characters are entered in the search field 410. Therefore, in step S512, it is checked whether further characters are entered into the search field (in addition to those already entered) or whether the search should be repeated to find additional matched further back in the history.

If no further characters are entered or the "find" button 412 is not selected, then the search process has completed successfully in S514. If further characters are entered or the "find" button 412 is selected, then in S516 the search starting position is set to the location of the previous match and then control is returned to S504 so that the searching process can be repeated.

Returning again to step S506, if a match is not found in the portion of the message history loaded into the memory 324, then in S518 a query is executed on the message database 326 to find a message containing the search term and having a timestamp that is earlier than the current history horizon. This is done because the messages between the present time and the current history horizon have already been searched for the search term, and it has been determined that the search term is not present. Preferably, the database query is an SQL query, but other query languages can also be used.

If, in S520, the search term is not found in the database query, then, in S522, the user is notified that the search has not found any messages containing the search term. This is preferably achieved by colouring the search field 410 and producing an auditory signal from the user terminal. The search process then terminated in S524.

If, however, the search term is found in the database in S520, then in S526 the individual message containing the matching term is loaded from the message database 326 into the memory 324.

In step S528 a further search is performed on the individual message loaded into the memory 324 to apply additional search constraints. This step is optional, but is useful to refine the search, taking into account further factors such as case-sensitivity or the requirement of finding only whole words, which may not have been considered by the database query. If the further search on the individual message does not find the search term in S530, then in S532 a further database query is performed to look for further messages containing the search term. The further database query searches backwards (i.e. earlier) in the history from the timestamp of the previous message found to contain the search term (but subsequently rejected in S530). Control then returns to S520 and the search process continues. As mentioned, S528 to S532 are optional, depending on whether further checks are needed on the message found using the database query.

If a match is found in S530, then in step S534 the message history 234 displayed in the UI 200 is updated to include the matching message found in the database 326. The message history 234 is scrolled to display the matching message to the user, and the matching text is highlighted. In step S536 the history horizon is changed to the time of the matching message. The change in history horizon is reflected in the scale 502, by the slider 504 moving to the time on the timeline 506 to the value of the new history horizon. This gives the user an immediate visual and graphical indication of the timestamp of the matching message.

At this point, the memory 324 contains the matching message and the messages up to the old history horizon. There are therefore intermediate messages between the old history horizon and the matching message that are not present in the memory 324 and not displayed. However, the changing of the history horizon results in these intermediate messages being loaded into the memory 324 in step S538, such that a complete history for all messages later than the matching messages is displayed to the user.

Preferably, the loading of the intermediate messages occurs in the background, such that it does not affect any user activity. The loading of the intermediate messages can be performed concurrently with the display of the matching message in the UI 200, such that the intermediate messages are filled in whilst the user is reading the matching message. More preferably, the intermediate messages are loaded in a sequence from the time of the matching message towards the old history horizon. This ensures that the messages that are closest to the matching message are loaded and displayed in the UI 200 first. This is advantageous because the display has been scrolled to focus on the matching message, and therefore the intermediate messages that are currently in view in the UI 200 are loaded first.

When the intermediate messages are loaded in S538, control then passes to S512, as described above, such that the search can be refined or repeated as required.

The process described above therefore permits display and searching of a message history document which will retain its integrity regardless of any user actions taken. No messages are omitted from the middle of the document, even if the document is loaded in chronologically disjoint parts. The interface gives the user complete control over the message history, allowing to the user to either display the history from a specific date, or search by specific phrase, whichever is the most convenient for their needs. The history and search controls operate in a synchronised manner that is transparent to the user in terms of its operation, with the search functionality expanding the history horizon as needed. In particular, the combined user interface for the searching the history and setting of the history horizon enables the user to easily navigate the history from the perspective of what is in it, and when it occurred.

The search technique enables searching of a long document that seamlessly combines searching from a part of the document loaded into the memory with a database search from parts of document stored in the database. The user 102 is not aware of how the history is searched, nor is he aware of which parts are searched in memory and which are searched on disk. To the perspective of the user, merely a simple text search is occurring and he is unaware that a database search is being performed.

While this invention has been particularly shown and described with reference to preferred embodiments, it will be understood to those skilled in the art that various changes in form and detail may be made without departing from the scope of the invention as defined by the appendant claims. For example, the above-described technique can be applied to any data that consists of discrete events, but is displayed as continuous text.

What is claimed is:

1. A method of searching for a data item in a chronological sequence of communication events relating to a user of a user terminal, said communication events stored in a communication event database comprising individually accessible records of each of the communication events, each record being associated with an event time at which the communication event occurred, the method comprising:
    loading a first portion of the stored chronological sequence of communication events from the database into a storage means, the first portion representing communication events occurring since a first time instance;
    displaying the contents of the first portion to the user in a user interface;
    searching for the data item in the first portion in the storage means; and
    in the case that the data item is not located in the first portion,
    querying the database to locate a target event comprising the data item and having an event time earlier than a predetermined first time instance;
    loading the target event into the storage means;
    displaying the contents of the target event to the user in the user interface; and
    loading communication events occurring in a time period between the event time of the target event and the first time instance into the storage means and updating the display to include the contents of the communication events occurring in the time period, wherein the step of querying the communication event database is performed in the case that the data item is not located in the first portion.

2. The method according to claim 1, wherein the steps of displaying the contents of the target event and loading communication events are performed concurrently.

3. The method according to claim 2, wherein the step of loading communication events and updating the display is performed in a sequence starting with the communication events occurring at the event time and ending with the first time instance.

4. The method according to claim 1 further comprising the step of receiving the data item from the user of the user terminal.

5. The method according to claim 1, wherein the data item comprises at least one character.

6. The method according to claim 1, further comprising the step of receiving a value for the first time instance from the user of the user terminal.

7. The method according to claim 6, wherein the value for the first time instance is selected by the user from a range displayed in the user interface.

8. The method according to claim 1, wherein the step of displaying the contents of the target event comprises scrolling the display to show the contents of the target event in the user interface and highlighting the data item in the target event.

9. The method according to claim 1, further comprising the step of, subsequent to loading the target event into the storage means, searching the target event in the storage means to apply additional search constraints of the data item.

10. The method according to claim 9, wherein, if the additional search constraints are not found in the target event, performing a further query on the communication event database to locate a further target event comprising the data item and having an event time earlier than the target event.

11. The method according to claim 1, wherein the communication events comprise at least one of: instant messages, short message service messages, file transfers, voice call records, video call records, and voicemail records.

12. The method according to claim 1, wherein the storage means is a computer memory of the user terminal.

13. The method according to claim 1, wherein the communication event database is stored on a hard disk drive of the user terminal.

14. The method according to claim 1, wherein the user terminal is connected to a packet-based communication network.

15. The method according to claim 1, wherein the user terminal is connected to a peer-to-peer communication network.

16. A computer program product comprising program code means which, when executed by a computer implement the steps according to the method of claim 1.

17. A user terminal arranged to search for a data item in a stored chronological sequence of communication events relating to a user of the user terminal, in comprising:
a communication event database comprising individually accessible records of each of the communication events, each record being associated with an event time at which the communication event occurred;
a storage means;
a user interface means arranged to display information to the user of the user terminal; and
processing means arranged to execute a communication client, wherein the communication client is arranged to query the communication event database to locate a target event comprising the data item and having an event time earlier than a predetermined first time instance, load the target event into the storage means, display the contents of the target event to the user in the user interface, and load communication events occurring in a time period between the event time and the first time instance of the target event into the storage means and update the display to include the contents of the communication events occurring in the time period, wherein the communication client is further arranged to, prior to querying the communication event database, load a first portion of the stored chronological sequence of communication events into the storage means, the first portion representing communication events occurring since the first time instance, display the contents of the first portion to the user in a user interface, and search for the data item in the first portion in the storage means, wherein the query of the communication event database is performed in the case that the data item is not located in the first portion.

18. The user terminal according to claim 17, wherein the communication client is arranged to display the contents of the target event and load communication events concurrently.

19. The user terminal according to claim 18, wherein the communication client is arranged to load communication events and update the display in a sequence starting with the communication events occurring at the event time and ending with the first time instance.

20. The user terminal according to claim 17, wherein the communication client is further arranged to receive the data item from the user of the user terminal.

21. The user terminal according to claim 17, wherein the data item comprises at least one character.

22. The user terminal according to claim 17, wherein the communication client is further arranged to receive a value for the first time instance from the user of the user terminal.

23. The user terminal according to claim 22, wherein the value for the first time instance is selected by the user from a range displayed in the user interface.

24. The user terminal according to claim 17, wherein the communication client is arranged to displaying the contents of the target event by scrolling the display to show the contents of the target event in the user interface and highlighting the data item in the target event.

25. The user terminal according to claim 17, wherein the communication client is further arranged to search the target event in the storage means to apply additional search constraints of the data item, subsequent to loading the target event into the storage means.

26. The user terminal according to claim 25, wherein, if the additional search constraints are not found in the target event, the communication client is arranged to perform a further query on the communication event database to locate a further target event comprising the data item and having an event time earlier than the target event.

27. The user terminal according to claim 17, wherein the communication events comprise at least one of: instant messages, short message service messages, file transfers, voice call records, video call records, and voicemail records.

28. The user terminal according to claim 17, wherein the storage means is a computer memory of the user terminal.

29. The user terminal according to claim 17, wherein the communication event database is stored on a hard disk drive of the user terminal.

30. The user terminal according to claim 17, wherein the user terminal is connected to a packet-based communication network.

31. The user terminal according to claim 17, wherein the user terminal is connected to a peer-to-peer communication network.

* * * * *